Jan. 17, 1933.   W. E. BOCK   1,894,290
MECHANICAL MOVEMENT
Filed Sept. 15, 1930   2 Sheets-Sheet 1

INVENTOR
William E. Bock
BY Whittemore Hulbert
Whittemore & Belknap
ATTORNEYS

Jan. 17, 1933. W. E. BOCK 1,894,290
MECHANICAL MOVEMENT
Filed Sept. 15, 1930 2 Sheets-Sheet 2
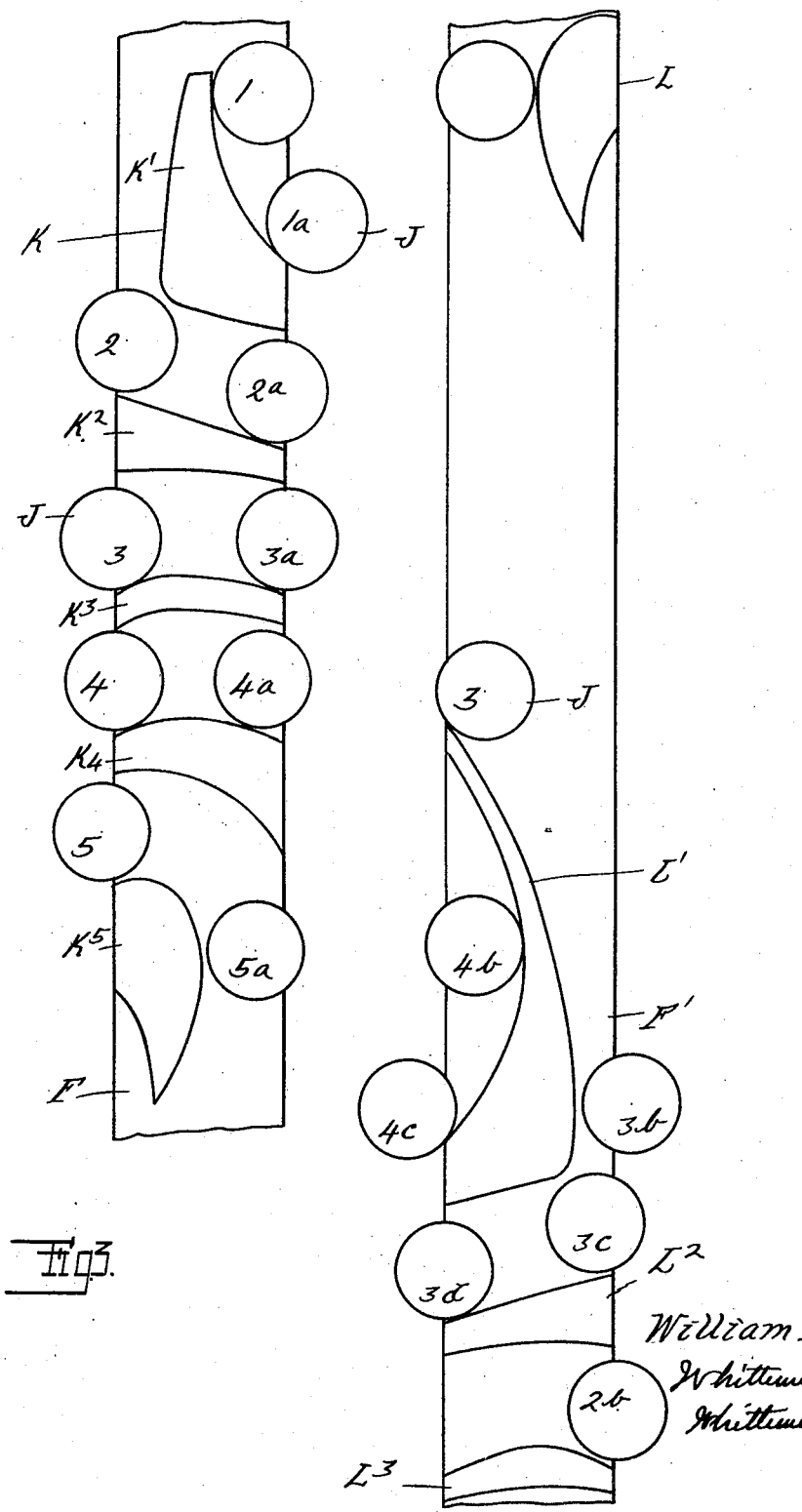

Patented Jan. 17, 1933

1,894,290

UNITED STATES PATENT OFFICE

WILLIAM E. BOCK, OF TOLEDO, OHIO, ASSIGNOR TO THE BOCK LAUNDRY MACHINE COMPANY, OF TOLEDO, OHIO, A CORPORATION OF OHIO

MECHANICAL MOVEMENT

Application filed September 15, 1930. Serial No. 482,081.

The invention relates to mechanical movements and more particularly to mechanisms for converting continuous rotary motion in one direction into oscillatory motion. It is the object of the invention to obtain a construction where a relatively high speed rotary motion such as that developed by an electric motor is converted into a comparatively slow oscillatory movement about the same axis. To this end the invention consists in the construction as hereinafter set forth.

In the drawings:

Figure 3 is a diagram showing a development of the cams showing their relation to the pin wheel in the development of oscillatory movement.

My improvement is applicable to various machines where it is necessary to convert rotary motion in one direction into alternate rotations in opposite directions, but I have specifically shown one development intended for use in washing machines. In the present state of the art various constructions of washing machines all use the same principle of rotating the fluid first in one direction and then in the reverse direction and at a comparatively slow speed. The motive power is generally an electric motor which runs at comparatively high speed and complicated mechanism is often introduced to effect a conversion of the one motion to the other. With my improved construction an exceedingly simple and compact mechanism is placed intermediate the motor shaft and the shaft to be oscillated, both shafts being preferably in axial alignment.

Figure 1:
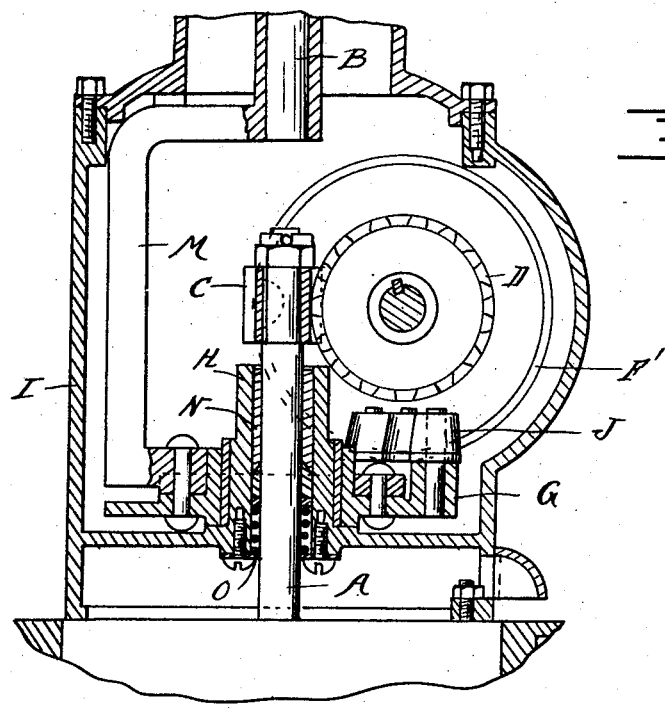
Figure 1 is a sectional elevation of the mechanism in the plane of the axis of rotation of the drive and driven members.
Figure 2:
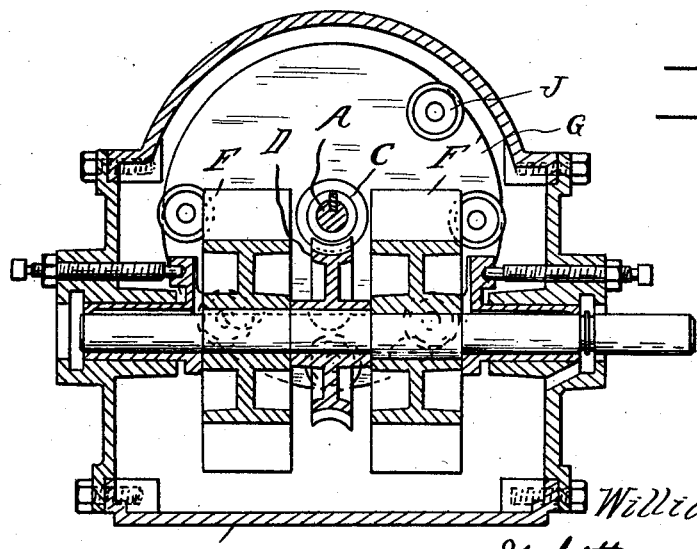
Figure 2 is a horizontal section therethrough.

As shown in Figure 1, A is the motor shaft and B the oscillatory shaft. Upon the motor shaft is a worm C engaging a worm gear D upon a shaft E which extends transversely to the direction of the motor shaft and is off-set to one side thereof. Upon opposite sides of the worm wheel D are cam wheels F and F' which are in the nature of gear wheels and which co-operate with a pin gear G. The latter is mounted upon a bearing H which surrounds and is concentric with the axis of the shaft A and which may be formed as a part of a housing I for enclosing the mechanism.

The pin gear G is provided with a number of laterally projecting pins which as specifically shown are rollers J and which in the rotation of the gear traverse an orbit which intersects with that of the cam wheels F and F'. These cam wheels are formed with a series of cam teeth K, K', L, L', so fashioned as to propel the roller pins J in one direction for substantially one-half revolution of the pin gear G and then to reverse the direction of movement for another substantially one-half revolution.

In Figure 3 the cam wheels F F' are developed into a single plane and the relation of the teeth K, K', L, L' etc., to these wheels is also indicated. The pin gear G as shown has eight roller teeth J which for identification are numbered 1 to 8. To simplify the illustration the cam teeth remain in fixed position and the roller teeth are shown progressing in the direction of the arrow. Also I have indicated by radial dotted lines the relation of the axis of the pin wheel to the teeth K K', etc. in the progressive movement, it being understood that in the actual mechanism the axis of the pin wheel is stationary and the teeth K, K' etc. are moved.

Starting with the roller tooth 1 at the top of Figure 3 it will be noted that this is in engagement with the cam tooth K' which during the relative movement will shift the roller 1 to the position 1a. This effects a partial rotation of the pin wheel about its axis so as to bring roller 2 into the path of the cam tooth K'. Further progressive movement will cause the tooth $K^2$ to move the roller 2 to the position 2a which will bring roller 3 into the path of the cam tooth $K^3$. In the further progressive movement the cam $K^2$ will shift roller 3 to the position 3a bringing roller 4 into the path of the cam tooth $K^4$. This in turn will shift said roller to the position 4a bringing the roller 5 in the path of the cam tooth $K^5$. All of these cam teeth are on the wheel F which is to the left of the axis of the pin gear. On cam wheel F' to the right there is a blank space opposite the teeth K', K² and K³ of the wheel F but opposite teeth K⁴ and K⁵ is a cam tooth L' which is the same as tooth K' reversed from left to right. It will be noted that in the position 4a of roller 4, roller 3 is just engaging the outer surface of the cam tooth L' and in the further progressive movement will travel downward along this surface, thereby preventing any backlash in the pin gear wheel. During this movement the roller 4 will travel down the inner surface of the cam tooth L' into the position 4b which corresponds in relation to cam tooth L' to the relation of roller 1 to cam K'. In this position roller 5 is at 5a and roller 3 is at 3b. Also it will be noted that the shape of the cam tooth L' is such as to gradually retard the rotation of the pin wheel G and that the limit of rotary movement in one direction is reached in the position 4b. Thus in the further movement of the cams, roller 4b moving to the position 4c rotates the pin wheel in the opposite direction and in so doing moves roller 3 to the position 3c where it comes into the path of cam tooth L². This will actuate roller 3 to shift it to the position 3d which brings roller 2 into the position 2b where it is in the path of cam teeth L³.

Without further detailed description it will be understood that the rotation of the pin wheel G will continue until it again assumes the position shown at the top of Figure 3 and which is the completion of the cycle or one complete revolution of the cam wheels F and F'. The movement imparted to the pin wheel is of the nature of a simple harmonic motion being gradually accelerated from the point of reversal and gradually decelerated before reversal. Thus much less strain is placed on the mechanism than is the case where the reversal of movement is effected by interrupted gear wheels or other mechanisms of the same character.

To transmit a movement of the pin wheel G to the shaft B I have provided a yoke or off-set connection M which permits of a half rotation of the pin wheel and of the shaft B without interference with the cams F F'. The housing I which encloses this mechanism may be filled with a lubricant and to prevent any of this lubricant draining downward along the motor shaft a packing gland N is placed in the bearing H and is automatically held tight by the pressure of a spring O.

What I claim as my invention is:

1. A mechanical movement comprising a pin gear wheel and a co-operating cam gear wheel arranged to rotate about transverse axes offset to be in different planes, said cam gear wheel having portions for alternately engaging the pins on opposite sides of the axial plane of said pin gear wheel to respectively rotate the same in opposite directions with positive and negative accelerations.

2. A mechanical movement comprising a pin gear wheel and a co-operating cam gear wheel arranged to rotate about the transverse axes, said cam gear wheel having portions for alternately engaging the pins on opposite sides of the axial plane of said pin gear wheel to respectively rotate the same in opposite directions, each of said portions including a plurality of cams for engaging successive pins with positive and negative accelerations.

3. A mechanical movement comprising a pin gear wheel and a co-operating cam gear wheel arranged to rotate about transverse axes, said cam gear wheel having portions on opposite sides of the axial plane of said pin gear wheel for alternately engaging the pins of said wheel, each of said portions including a cam for engaging a stationary pin and gradually accelerating the same and succeeding cams for engaging succeeding pins including a final one for decelerating to the zero point.

4. A mechanical movement comprising a pin gear wheel, a co-operating cam gear wheel arranged to rotate about transverse axes, said cam gear wheel having portions on opposite sides of the axial plane of said pin gear wheel for alternately engaging the pins of said wheel, and including a series of cams for imparting a substantially harmonic oscillation to said pin gear wheel.

5. A mechanical movement comprising a driving shaft, a driven shaft in axial alignment therewith, a pin gear wheel upon said driven shaft, a shaft extending transverse to and off-set from the axis of said drive and driven shafts, a reduction gearing between said drive shaft and transverse shaft, a cam gear wheel on said transverse shaft having portions on opposite sides of the plane of said drive and driven shaft axis and engaging said pin gear to alternately rotate the same in reverse directions.

6. A mechanical movement, the combination with a drive shaft, of a driven shaft in axial alignment therewith, a pin gear wheel on said driven shaft, a shaft extending transverse to and off-set from the axis of said drive and driven shaft, a worm gearing between said drive shaft and transverse shaft, and cam gear wheels on opposite sides of said worm gearing operatively engaging said pin gear wheel to alternately rotate the same in reverse directions.

7. A mechanical movement comprising a drive shaft, a driven shaft in axial alignment therewith, a pin gear wheel sleeved about said drive shaft, a shaft extending transverse to and off-set from the axis of said drive and driven shafts, a worm gearing between said drive shaft and transverse shaft, cam gear wheels on opposite sides of said worm gearing operatively engaging said pin gear wheel to alternately rotate the same through a partial revolution in reverse directions, and a yoke connection between said pin gear wheel and said driven shaft off-set to clear said cam gear wheels in said partial revolution of said pin gear wheel.

8. A mechanical movement comprising a drive shaft, a driven shaft, a journal bearing for said drive shaft, a pin gear wheel sleeved upon said journal bearing eccentric with said driven shaft, a shaft extending transverse to and off-set from the axis of said drive and driven shafts, a worm gearing between said drive shaft and transverse shaft, a cam gear wheel having portions on opposite sides of said worm gearing operatively engaging said pin gear wheel, each of said portions having a series of cams for engaging successive pins of said pin gear wheel to actuate the same through a limited angle with a substantially harmonic movement, and a yoke connection between said pin gear wheel and said driven shaft off-set to clear said cam gear wheel during the partial rotation of said pin gear wheel.

9. A mechanical movement comprising a pin gear wheel, and a co-operating cam gear wheel arranged to rotate about transverse axes offset to be in different planes, said cam gear wheel having portions for alternately engaging the pins on opposite sides of the said axial plane of said pin gear wheel, each including a series of cams for actuating successive pins through a limited angle with a substantially harmonic movement, the movement imparted on the opposite sides being in reverse directions.

In testimony whereof I affix my signature.

WILLIAM E. BOCK.